Nov. 14, 1950  C. McLELLAN  2,529,779
LID CATCHER
Filed Sept. 10, 1948

Inventor,
CHARLES McLELLAN.
By E. E. Vrooman & Co.,
ATTORNEYS.

Patented Nov. 14, 1950

2,529,779

UNITED STATES PATENT OFFICE 2,529,779

LID CATCHER

Charles McLellan, Los Angeles, Calif.

Application September 10, 1948, Serial No. 48,707

2 Claims. (Cl. 294—64)

1

This invention relates to a lid catcher.

An object of this invention is the production of a simple and highly efficient device for holding the top of a container, such as a can, from falling down on the contents of the container when the top has been cut free from the container.

Another object of the invention is the production of an efficient device that can be easily and quickly applied to a container, such as a can, and which will operate free from the can opener, while at the same time will hold the top from falling into the container during and after the cutting of the top of the container.

A still further object of the invention is the construction of an efficient device for supporting the cut top of the container, and the easy removing of the cut top at the will of the operator.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a top plan view of the device, showing the same mounted on a container, while

Figure 1:
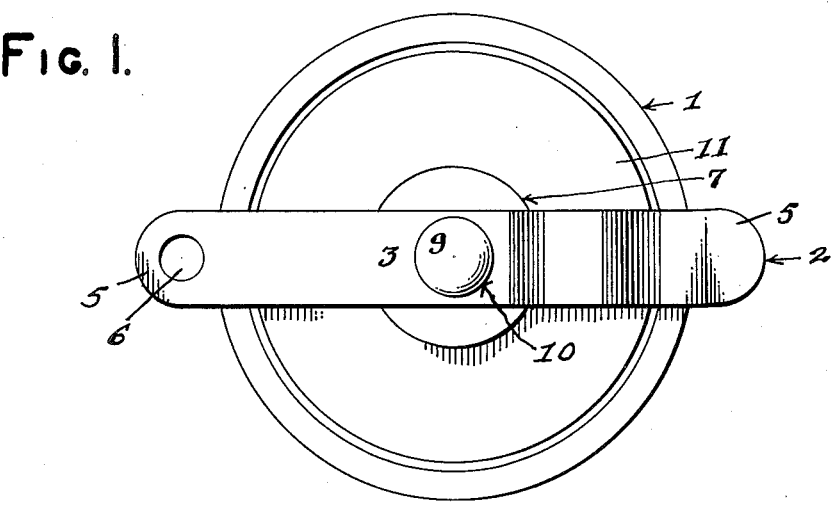
Figure 2:
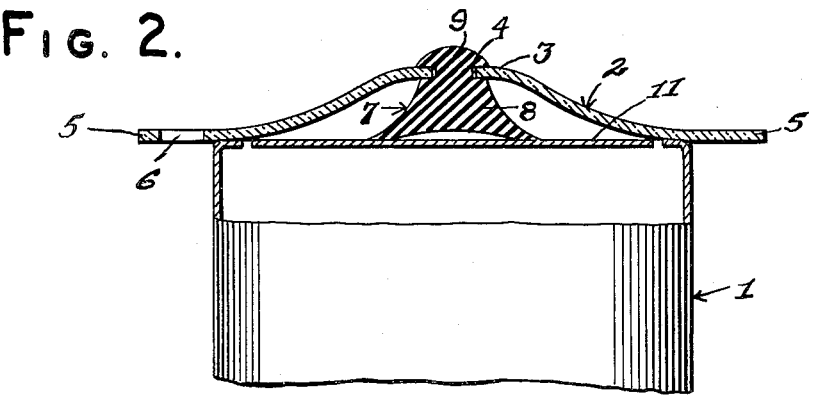
Figure 2 is a longitudinal, vertical, sectional view of the same.
Figure 3:
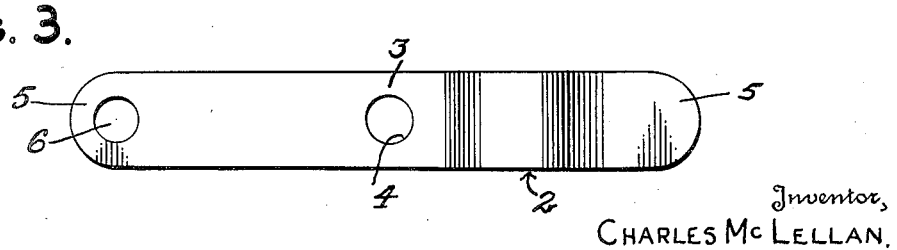
Figure 3 is a top plan view of the elongated bearing member of the device.
Figure 4:
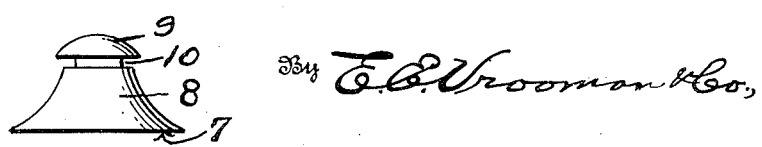
Figure 4 is a view in side elevation of the suction cup of the device.

Referring to the drawings, in which the preferred embodiment of this invention is illustrated, I designates a container or receptacle, which may be a can, or like device of any type.

The device constructed in accordance with this invention comprises an elongated bearing member 2, which has at its center an outwardly bowed portion 3; this portion 3 is flat at its center and is provided with a button-receiving aperture 4. The outwardly bowed central portion is provided with two outwardly extending flat arms 5; these arms are formed in the same horizontal plane and when the device is on the container, these arms travel or ride around the upper edge of the container, as clearly shown in the drawings. Near one end of one of the flat arms 5 is an aperture 6. A nail or hook (not shown) may extend through this aperture 6 for suspending the device on a wall or support.

A suction cup 7 is a part of the device. This cup 7 comprises a body 8 and a button 9. Between body 8 and button 9 is a groove 10. To assemble the suction cup 7 with the elongated bearing member 2, the operator forces button 9 through the aperture 4 so that the button is removably mounted upon the bearing member 2.

To place the device upon the container 1, the suction cup is pressed upon the lid or top 11 of

2 container 1, with the arms 5 resting upon the container as shown. A common can opener can be used to cut the lid 11 free of container 1, and as the can opener moves around the top, the elongated bearing member 2 revolves freely in front of the can opener, and when the lid or top 11 has been cut free of the container 1, the device will hold the lid or top from falling into the container, upon the contents thereof. To remove the device from the lid or top 11, all that is necessary is for the operator to pinch the body 8 of the suction cup 7, whereupon the device is released from the lid or top.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. Means to support a can lid after being severed from the can, said means comprising a narrow strip of spring material, said strip being bowed upwardly at the middle and having lateral ends projecting in opposite directions for resting on the upper edge of a can after the lid has been severed therefrom, said strip having a loosely-fitting centrally disposed elastic vacuum cup extending downwardly from the strip to rest on and support a can lid, and said strip being freely revolvable on said vacuum cup.

2. Means to support a can lid after being severed from the can, said means comprising a narrow strip of spring material, said strip being bowed upwardly at the middle and having lateral ends projecting in opposite directions for resting on the upper edge of a can after the lid has been severed therefrom, and said strip having a centrally disposed elastic vacuum cup extending downwardly from the strip to rest on and support a can lid, and said strip having a centrally disposed opening and the vacuum cup member being grooved to engage in said opening and be held by the strip.

CHARLES McLELLAN.

REFERENCES CITED

The following references are of record in the file of this patent:

UNITED STATES PATENTS

| Number | Name | Date |
|--------|------|------|
| 670,391 | Robinson | Mar. 19, 1901 |
| 957,804 | Schroeder | May 10, 1910 |
| 993,989 | Hazelrigg | May 30, 1911 |
| 2,265,491 | Powers | Dec. 9, 1941 |
| 2,296,073 | Walgo | Sept. 15, 1942 |
| 2,384,324 | Martin | Sept. 4, 1945 |